(12) United States Patent
Nodera

(10) Patent No.: US 12,165,481 B2
(45) Date of Patent: *Dec. 10, 2024

(54) MOBILE REGISTRATION TERMINAL AND METHOD FOR REGISTERING AN AGE-RESTRICTED COMMODITY

(71) Applicant: Toshiba Tec Kabushiki Kaisha, Tokyo (JP)

(72) Inventor: Nobutomo Nodera, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,325

(22) Filed: Jun. 20, 2023

(65) Prior Publication Data

US 2023/0351866 A1 Nov. 2, 2023

Related U.S. Application Data

(63) Continuation of application No. 17/549,823, filed on Dec. 13, 2021, now Pat. No. 11,721,182.

(30) Foreign Application Priority Data

Mar. 9, 2021 (JP) .................. 2021-037343

(51) Int. Cl.
*G07G 1/00* (2006.01)
*B62B 3/14* (2006.01)
(Continued)

(52) U.S. Cl.
CPC ......... *G07G 1/0081* (2013.01); *B62B 3/1424* (2013.01); *B62B 5/0096* (2013.01);
(Continued)

(58) Field of Classification Search
None
See application file for complete search history.

(56) References Cited

U.S. PATENT DOCUMENTS 7,769,638 B1 * 8/2010 Mollett ............. G06Q 30/0601
705/26.1
11,721,182 B2 * 8/2023 Nodera ................. B62B 3/1424
235/383
(Continued)

FOREIGN PATENT DOCUMENTS

EP 3786869 A1 3/2021
JP 2009-020667 A 1/2009
(Continued)

OTHER PUBLICATIONS

Office Action mailed Nov. 1, 2023 in corresponding Korean Patent Application No. 10-2021-0178329, 12 pages. (with Translation).
Notice of Reasons for Refusal mailed Aug. 27, 2024 in corresponding Japanese Patent Application No. 2021-037343, 6 pages. (with Translation).

*Primary Examiner* — Suezu Ellis
(74) *Attorney, Agent, or Firm* — Kim & Stewart LLP

(57) ABSTRACT

A mobile registration terminal for a customer in a store includes a network interface, a display, a scanner, and a processor configured to: when a commodity sold at the store is scanned through the scanner, determine whether the commodity is an age-restricted commodity, upon determining that the commodity is not an age-restricted commodity, register the commodity, and upon determining that the commodity is an age-restricted commodity, control the display to display a screen indicating that an age of the customer needs to be verified by a clerk of the store, and after clerk information about the clerk is input through the scanner, control the network interface to transmit to an
(Continued)

external device the clerk information for checkout of the commodity without further verification of the age of the customer.

20 Claims, 8 Drawing Sheets

(51) Int. Cl.
    *B62B 5/00*          (2006.01)
    *G06Q 20/18*        (2012.01)
    *G06Q 20/20*        (2012.01)
    *G07G 1/14*         (2006.01)

(52) U.S. Cl.
    CPC ........... *G06Q 20/18* (2013.01); *G06Q 20/202* (2013.01); *G07G 1/0009* (2013.01); *G07G 1/14* (2013.01)

(56) References Cited

U.S. PATENT DOCUMENTS

| | | | |
|---|---|---|---|
| 2007/0214061 A1 | 9/2007 | Toyokawa et al. | |
| 2019/0259014 A1 | 8/2019 | Katayama et al. | |
| 2022/0335483 A1* | 10/2022 | Tanabe | G07C 9/00563 |
| 2024/0054870 A1* | 2/2024 | Ikezawa | G06Q 30/0633 |

FOREIGN PATENT DOCUMENTS

| | | |
|---|---|---|
| JP | 2009-163323 A | 7/2009 |
| KR | 20070089563 A | 8/2007 |
| KR | 20120124198 A | 11/2012 |
| KR | 20180135246 A | 12/2018 |

\* cited by examiner

FIG. 4

| COMMODITY CODE | COMMODITY NAME | PRICE | AGE-RESTRICTED COMMODITY FLAG |
|---|---|---|---|
| 10001 | ○○ | ××× | 1 |
| ... | ... | ... | ... |

FIG. 5

| CLERK CODE | NAME |
|---|---|
| AAA | ○○○○ |
| ... | ... |

FIG. 6

| MEMBER CODE | NAME | MEMBER INFORMATION |
|---|---|---|
| aaa | ○○○○ | ... |
| ... | ... | ... |

FIG. 7

| MEMBER CODE | AGE CONFIRMATION FLAG |
|---|---|
| aaa | 1 |
| ... | ... |

MOBILE REGISTRATION TERMINAL AND METHOD FOR REGISTERING AN AGE-RESTRICTED COMMODITY

CROSS-REFERENCE TO RELATED APPLICATION

This application is a continuation of U.S. patent application Ser. No. 17/549,823, filed Dec. 13, 2021, which is based upon and claims the benefit of priority from Japanese Patent Application No. 2021-037343, filed Mar. 9, 2021, the entire contents of which are incorporated herein by reference.

FIELD

Embodiments described herein relate to an information processing terminal device, a method performed thereby, and a system including such an information processing terminal device.

BACKGROUND

In recent years, shopping carts equipped with tablet terminals and scanners have become used in stores such as supermarkets. Customers who shop at such stores have a scanner to read a code symbol such as a barcode attached to an item of merchandise to be purchased on the store's sales floor. The merchandise information including the name, price, or the like of the registered item is stored in the tablet terminal and then subsequently transferred to a checkout device that performs a checkout process in which the customer pays the price of the registered items being purchased. The payment is processed by a checkout device such as a point of sales (POS) terminal operated by a clerk or the customer himself or herself.

Instead of tablet terminals and scanners provided by the stores, a system that enables customers to shop (register items) using mobile terminals such as smartphones owned by the customers themselves has also been adopted. In such a system, an application program for registering items is installed on the customers' smartphones. A code symbol attached to the items of merchandise can be read by using the camera function of the smartphone.

According to the above-described related technology, customers do not need to separately register items for purchase at a checkout device, such a POS terminal, operated by a clerk or the customers themselves, so that there is a possible advantage in eliminating cash register waiting times, that is, waiting in line for other customers to complete the registration and accounting process.

Additionally, among the merchandise items sold by stores, there are items that require a store clerk to confirm the age of a customer such as alcoholic beverages (hereinafter, also referred to as "age-restricted commodities"). In the above-described related technology, when a customer purchases an age-restricted commodity, the customer must generally still be asked to confirm his or her age a by a clerk at the checkout device at the time of or before payment processing is performed. It is generally the same whether it is an checkout device is operated by a clerk or by the customers themselves. Therefore, when a customer purchases an age-restricted commodity, this adds delay to the checkout processing, so cash register waiting times might not be reduced by a desirable amount.

BRIEF DESCRIPTION OF THE DRAWINGS

FIG. 4 depicts a data structure of a commodity master stored in an information processing terminal device.

FIG. 5 depicts a data structure of a clerk master stored in an information processing terminal device.

FIG. 6 depicts a data structure of a member master stored in an information processing terminal device.

FIG. 7 depicts a data structure of an age confirmation management file stored in an information processing terminal device.

DETAILED DESCRIPTION

In general, according to certain embodiments, there is provided an information processing terminal device operatable by a customer in a store by which a checkout process can be quickly performed even when an age-restricted commodity is purchased.

According to one embodiment, a mobile registration terminal for a customer in a store includes a network interface, a display, a scanner, and a processor configured to: when a commodity sold at the store is scanned through the scanner, determine whether the commodity is an age-restricted commodity, upon determining that the commodity is not an age-restricted commodity, register the commodity, and upon determining that the commodity is an age-restricted commodity, control the display to display a screen indicating that an age of the customer needs to be verified by a clerk of the store, and after clerk information about the clerk is input through the scanner, control the network interface to transmit to an external device the clerk information for checkout of the commodity without further verification of the age of the customer.

Hereinafter, information processing terminal devices and programs according to certain example embodiments will be described with reference to the drawings. The present disclosure is not limited to these example embodiments. In certain embodiments described below, an information processing terminal device is used as a mobile registration terminal such as a tablet terminal provided by a store, but the information processing terminal device may be a mobile terminal such as a smartphone owned by a customer. In examples described below, the information processing terminal device outputs checkout information to a checkout device permitting a customer to settle a sale transaction by paying the total price of registered merchandise to the checkout device that can be operated by the customer him/herself, but in other examples the checkout information (settlement information) may output to a checkout device operated by a store clerk.

First Embodiment

Figure 1:
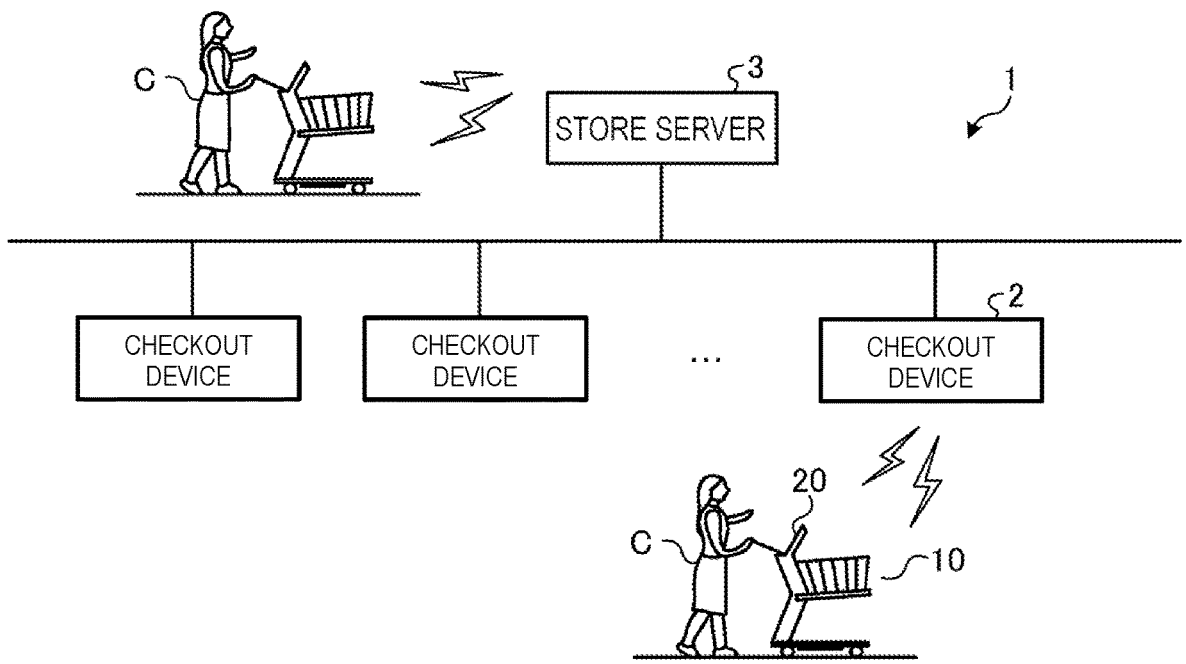
FIG. 1 is a diagram illustrating a checkout system including an information processing terminal device according to a first embodiment.

Hereinafter, an information processing terminal device and a program according to a first embodiment will be described with reference to the drawings. FIG. 1 is a diagram illustrating a checkout system 1 including an information processing terminal device, which is a tablet terminal 20 in this example. The checkout system 1 of the present embodiment is used in a store that sells age-restricted commodities, for example, a supermarket that sells alcoholic beverages and/or cigarettes. The checkout system 1 includes a plurality of checkout devices 2, a store server 3, and a plurality of shopping carts 10 each having the tablet terminal 20 attached thereto. The checkout devices 2 and the store server 3 are connected to each other via a network such as a local area network (LAN). Each tablet terminal 20 can be connected to any of the checkout devices 2 and the store server 3 and are able to communicate with each other via a wireless LAN or the like.

The checkout device 2 is a so-called self-service checkout device by which, for example, a customer C performs a checkout operation by him/herself. The checkout device 2 executes an checkout process related to payment by cash payment or cashless payment such as credit payment, based on commodity information received from the tablet terminal 20. That is, for example, the tablet terminal 20 provides a list of registered items being purchased by customer C in a sales transaction. The checkout process in this context is a process of the customer C paying the price of registered commodities. The checkout device 2 may be a POS terminal operated by a clerk in some examples.

The store server 3 receives, from each checkout device 2, the information regarding the registered items (commodities) being purchased in the sales transaction along with customer payment information received in the checkout process. In this context, the payment information is information related to the payment method, and the like. Generally, the store server 3 receives, from each checkout device 2, sales information corresponding to the sales amount during a predetermined period (for example, one day). The store server 3 centrally manages the commodity information, payment information, sales information, or the like received from each checkout device 2, and tracks overall sales at the store. The store server 3 stores a commodity master 212 in which commodity codes and their commodity information (merchandise names, prices, or the like) are associated with each other for the commodities sold in the store, and transmits the commodity master 212 to each tablet terminal 20.

The shopping carts 10 are provided on the sales floor of the store and are used by customers C to carry commodities. The customer C pushes and moves the shopping cart 10 on the sales floor and stores the commodities to be purchased in the shopping cart 10.

Figure 2:
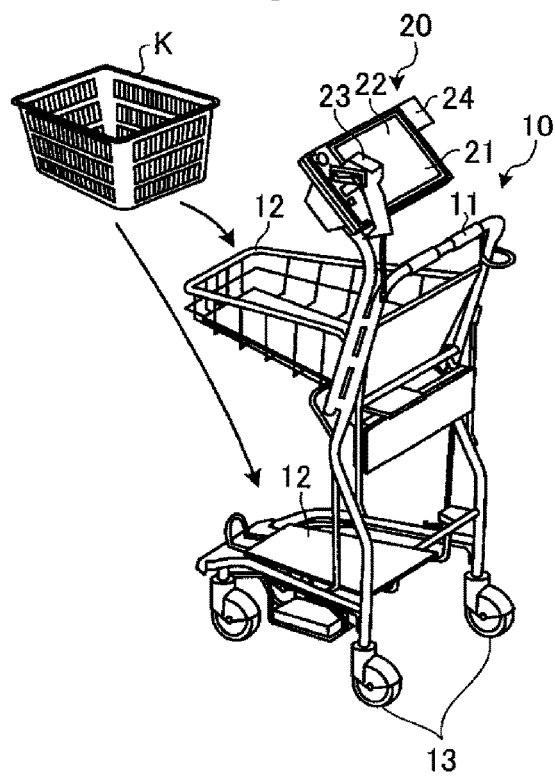
FIG. 2 depicts an appearance of a cart to which an information processing terminal device is attached.

FIG. 2 depicts an appearance of the shopping cart 10 to which the tablet terminal 20 can be attached. The shopping cart 10 includes a handle 11, a basket loading portion 12, and casters 13, and the tablet terminal 20 is attached to the shopping cart 10 above the handle 11. The handle 11 is grasped by the customer C to move the shopping cart 10. The basket loading portion 12 has an upper and lower two-stage structure, and a basket K for storing a commodity purchased by the customer C can be loaded thereon. The basket K may be provided integrally with the shopping cart 10. The casters 13 are provided at the lower four corners of the shopping cart 10. By the casters 13, the shopping cart 10 can be moved freely in the store. The shopping cart 10 is a movable body including the tablet terminal 20.

The tablet terminal 20 includes a display 21, a touch panel 22, a scanner 23, and a card reader 24. Each of the scanner 23 and the card reader 24 may be an external device connected to the tablet terminal 20. The display 21 is, for example, a liquid crystal panel, and functions as a display unit for displaying various types of information. The display 21 displays, for example, commodity information on a commodity registered, a user interface (UI) component for the customer C to operate, and the like. The touch panel 22 is provided on the surface of the display 21 and outputs information according to the touched position to a control unit 200 (see FIG. 3) of the tablet terminal 20, so that the touch panel 22 functions as an operation input unit for accepting the user's operations. The touch panel 22 outputs to the control unit 200, for example, a checkout instruction instructing to transmit checkout information to the checkout device 2. The checkout information is information necessary for a checkout process for payment of the price of the commodities purchased by the customer C.

The scanner 23 is detachably provided on the shopping cart 10. The scanner 23 reads a commodity code for identifying the commodity from a code symbol attached to the commodity. Specifically, the scanner 23 recognizes a code symbol such as a bar code or a two-dimensional code attached to a commodity purchased by the customer C optically or by imaging. Then, the scanner 23 decodes the recognized code symbol and reads the commodity code indicated by the code symbol. In the following explanation, the code symbol attached to a commodity is assumed to be a bar code. The scanner 23 transmits the read commodity code to the control unit 200 of the tablet terminal 20. Note that the code symbol recognized by the scanner 23 may be decoded by the control unit 200 of the tablet terminal 20. The scanner 23 may be a radio frequency identification (RFID) reading device that reads a commodity code from a wireless tag attached to a commodity.

The card reader 24 reads a member code from a medium such as a membership card or a point card of the customer C. The member code is an example of member identification information for identifying a member of a store. The card reader 24 may be a magnetic card reader that reads member information from a magnetic card, or an IC card reader that reads information from a card containing an IC chip.

The shopping cart 10 may include a payment terminal (not illustrated) for performing cashless payment such as credit card payment. In such a case, the payment terminal functions as the checkout device 2, and is connected via a network to a company's payment server that makes payments. The tablet terminal 20 may have a function of a checkout processing unit for communicating with the payment server to perform cashless payment. In such a case, the card reader 24 can read card information on a credit card and electronic money information on an electronic money card.

Figure 3:
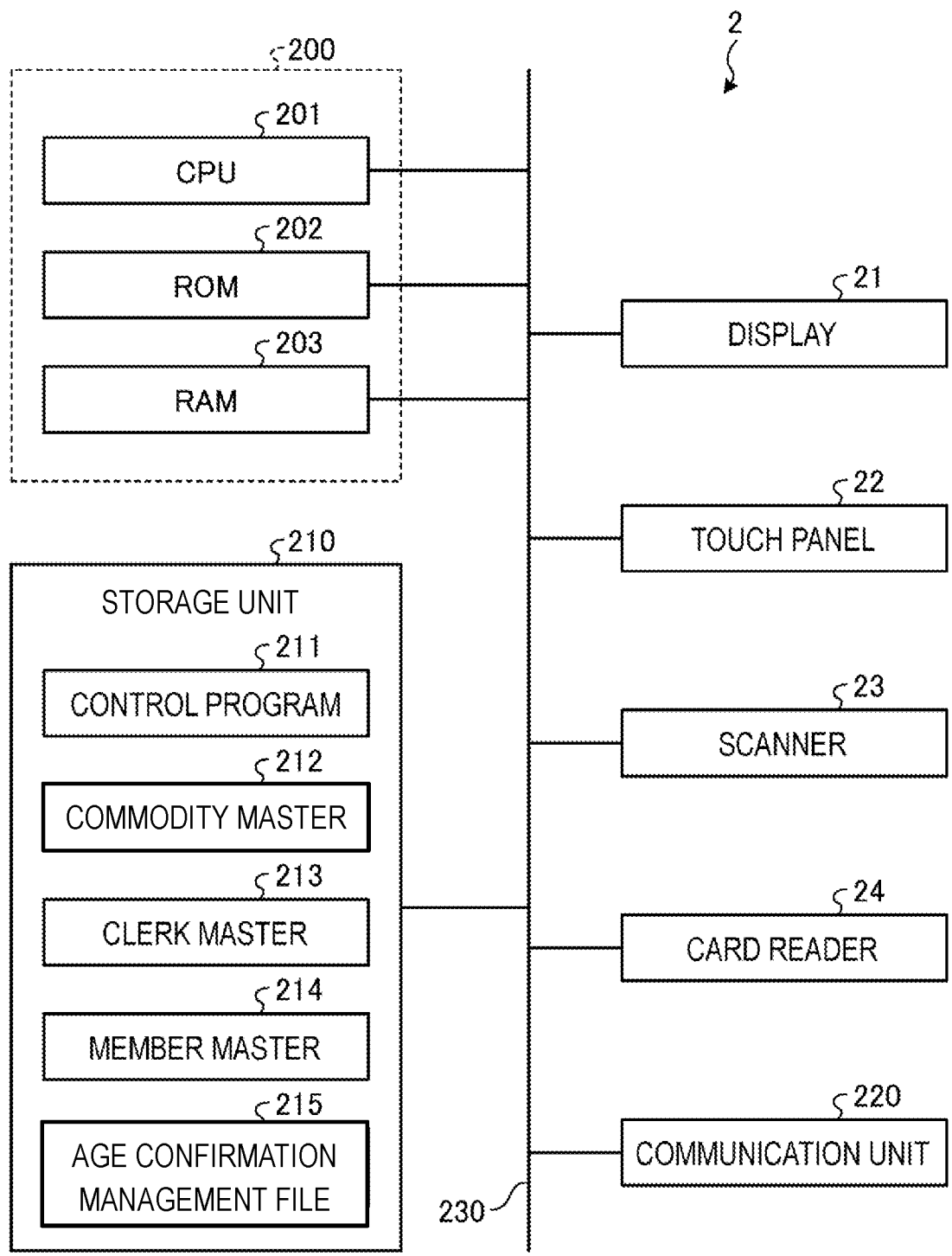
FIG. 3 is a hardware block diagram of an information processing terminal device.

FIG. 3 is a hardware block diagram of the tablet terminal 20. The tablet terminal 20 includes a control unit 200, a storage unit 210, the display 21, the touch panel 22, the scanner 23, the card reader 24, and a communication unit 220. The control unit 200, the storage unit 210, the display 21, the touch panel 22, the scanner 23, the card reader 24, and the communication unit 220 are connected to each other via a bus 230 or the like.

The control unit 200 includes a processor such as a central processing unit (CPU) 201, a read only memory (ROM) 202, and a random access memory (RAM) 203. The CPU 201, the ROM 202, and the RAM 203 are connected to each other via the bus 230.

The CPU 201 controls the overall operation of the tablet terminal 20. The ROM 202 stores various programs executed by the CPU 201 and various data. The RAM 203 is used as a work area by the CPU 201, and temporarily stores various programs and various data copied from the ROM 202 and the storage unit 210. The CPU 201 of the control unit 200 executes various control processes of the tablet terminal 20 according to a control program 211 stored in the ROM 202 or the storage unit 210 and loaded into the RAM 203.

The storage unit 210 is a storage medium such as a hard disk drive (HDD) or a flash memory, and maintains stored data even when the power is cut off. The storage unit 210 stores the control program 211, the commodity master 212, a clerk master 213, a member master 214, and an age confirmation management file 215.

The control program 211 is a program for causing the tablet terminal 20 to function as a commodity registration device in the checkout system 1.

The commodity master 212 is a master file that stores information on commodities soled in the store. FIG. 4 depicts a data structure of the commodity master 212. Each record registered in the commodity master 212 is associated with a commodity code, a commodity name, a price, and an age-restricted commodity flag. Since the commodities sold in the store change daily, the commodity master 212 is appropriately updated by the store server 3 connected via the communication unit 220.

The commodity code is a code for identifying a commodity and is an example of commodity identification information. The commodity name is information indicating the name of the commodity. The price is information indicating the unit price of the commodity. The age-restricted commodity flag is information indicating whether the commodity is an age-restricted commodity, that is, a commodity that requires age verification by the store when purchased (hereinafter, also referred to as "age confirmation"). A commodity in which "1" is registered in the record of the age-restricted commodity flag is an age-restricted commodity, and a commodity in which "0" is registered is not an age-restricted commodity. Examples of such an age-restricted commodity include alcoholic beverages and cigarettes.

The clerk master 213 is a master file that stores clerk information. FIG. 5 depicts a data structure of the clerk master 213. Each record registered in the commodity master 212 is associated with a clerk code and a name.

The clerk code is a code for identifying a clerk. In other words, the clerk code is information for identifying a clerk of the store that sells commodities, and is an example of clerk identification information. The name is information indicating the name of the clerk. In the present embodiment, the clerk master 213 is stored in the storage unit 210 and the clerk code is used as the clerk identification information, but the clerk identification information may not be the information that identifies an individual clerk. For example, a file in which a store code and the names of clerks are associated with each other may be stored in the storage unit 210, and the store code may be used as the clerk identification information.

The member master 214 is a master file that stores information on store members. FIG. 6 depicts a data structure of the member master 214. Each record registered in the member master 214 is associated with a member code, a name, and member information.

The member code is a code for identifying a member, and is an example of member identification information for identifying a member of the store. The name is information indicating the name of the member. The member information is information about the member such as the member's gender, age, contact information (e.g., a telephone number, an e-mail address, or the like). Past purchase history, the current number of points, and the like may be registered as the member information.

The age confirmation management file 215 is a file that manages information indicating whether each member can purchase age-restricted commodities. FIG. 7 depicts a data structure of the age confirmation management file 215. Each record registered in the age confirmation management file 215 is associated with a member code and an age confirmation flag. The age confirmation management file 215 stores age confirmation information that associates member identification information with information indicating that clerk identification information has been received. Alternatively, a field for the age confirmation flag may be provided in the member master 214, and the age confirmation information may be registered in the member master 214.

The member code is a code for identifying a member of the store. The age confirmation flag is information indicating whether a clerk has performed age confirmation, i.e., age-restricted commodities can be purchased. A member for which "1" is registered in the record of the age confirmation flag is a member whose age has been confirmed by a clerk, and a member for which "0" is registered is a member whose age has not been confirmed. In the present embodiment, "1" is registered in the record of the age confirmation flag when the age is confirmed by a clerk at the time of purchasing an age-restricted commodity. However, in a case where the age of the member can be confirmed at the time of member registration, for example, when the confirmed member's age is 20 years or older, "1" may be registered in the record of the age confirmation flag at the time of member registration.

The commodity master 212, the clerk master 213, the member master 214, and the age confirmation management file 215 may be stored in another memory area of the store server 3 other than the storage unit 210.

Referring back to FIG. 3, the communication unit 220 is a network interface circuit configured to communicate with an external device such as the checkout device 2 or the store server 3. The control unit 200 can control the communication unit 220 to transmit and receive information or data to and from such an external device.

Figure 8:
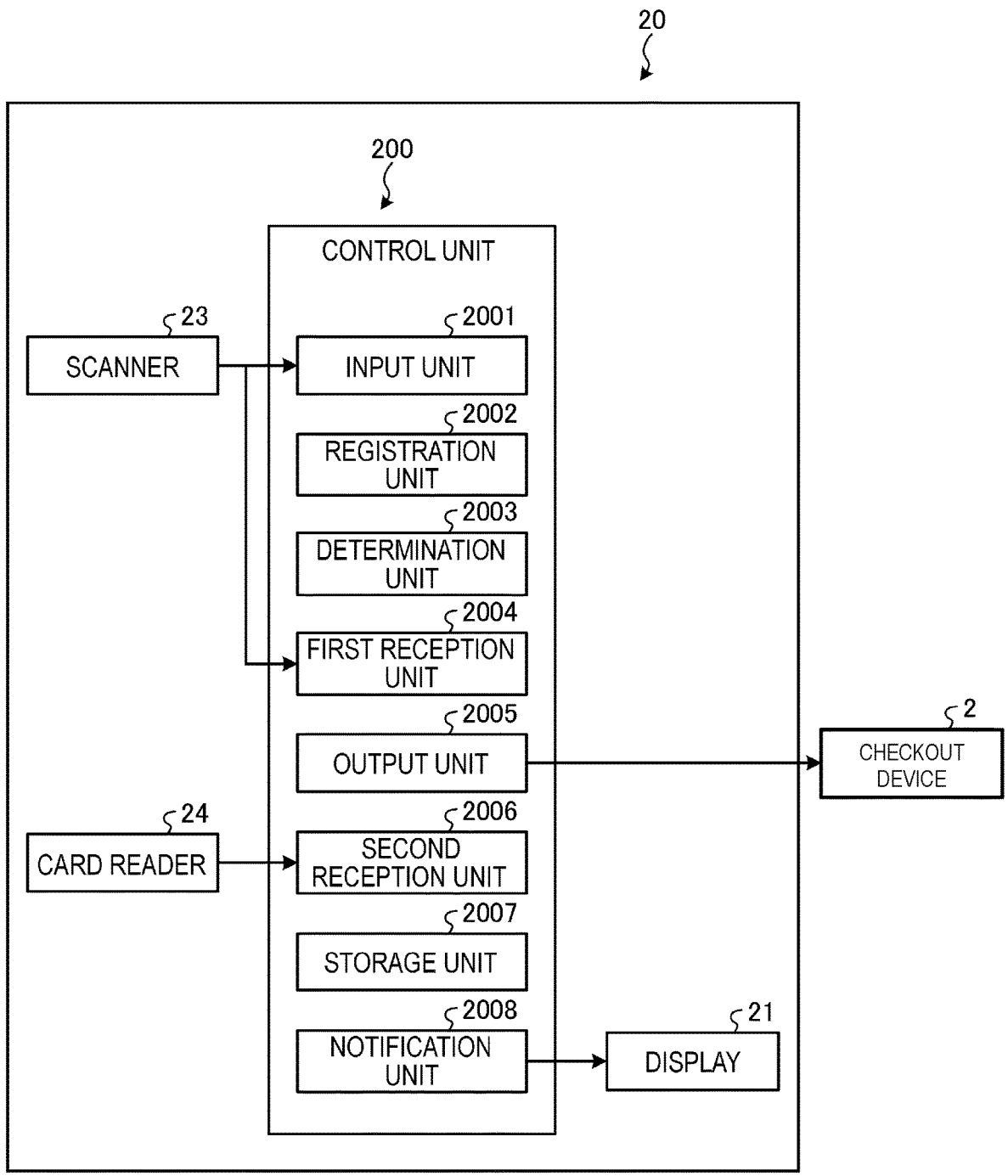
FIG. 8 is a functional block diagram of an information processing terminal device.

Subsequently, the functional configuration of the tablet terminal 20 will be described. FIG. 8 is a functional block diagram of the tablet terminal 20. The control unit 200 of the tablet terminal 20 executes the control program 211 stored in the ROM 202 or the storage unit 210, and thereby functioning as an input unit 2001, a registration unit 2002, a determination unit 2003, a first reception unit 2004, an output unit 2005, a second reception unit 2006, a storage unit 2007, and a notification unit 2008. Each of the functions may be performed by hardware such as a dedicated circuit.

Commodity identification information for identifying a commodity is input to the input unit 2001. Specifically, a commodity code read by the scanner 23 from the barcode attached to the commodity is input to the input unit 2001. Various types of information are input to the input unit 1001 from the touch panel 22.

The registration unit 2002 registers the commodity based on the commodity identification information input to the input unit 2001. Specifically, the registration unit 2002 acquires the commodity information (i.e., the commodity name, price, or the like) corresponding to the commodity code input to the input unit 2001 from the commodity master 212 and stores the acquired commodity information in the RAM 103. The commodity registration refers to storing commodity information on a commodity identified by a commodity code input to the input unit 2001.

The determination unit 2003 determines whether the commodity identified by the commodity code input to the input unit 2001 is an age-restricted commodity. Specifically, when the commodity code is input to the input unit 2001, the determination unit 2003 refers to the commodity master 212 and determines whether "1" is registered in the field of the age-restricted commodity flag corresponding to the input commodity code. When "1" is registered in the field of the age-restricted commodity flag, the determination unit 2003 determines that the commodity identified by the commodity code input to the input unit 2001 is an age-restricted commodity. When "0" is registered in the field of the age-restricted commodity flag, the determination unit 2003 determines that the commodity identified by the commodity code input to the input unit 2001 is not an age-restricted commodity.

The first reception unit 2004 acquires clerk identification information for identifying a clerk of the store. Specifically, the first reception unit 2004 controls the scanner 23 to read a clerk code from a barcode printed on the clerk's nameplate. The first reception unit 2004 may acquire the clerk code input to the touch panel 22.

The output unit 2005 controls the communication unit 220 to output, to the checkout device 2, checkout information for paying the price of the commodity registered by the registration unit 2002. When the commodity registered by the registration unit 2002 includes an age-restricted commodity that requires age confirmation, the output unit 2005 controls the communication unit 220 to output to the checkout device 2, information (hereinafter, also referred to as "confirmed information") indicating that the clerk identification information has been received, and checkout information about the price of the commodity registered by the registration unit 2002. Specifically, in a case where commodities registered by the registration unit 2002 include an age-restricted commodity that requires age confirmation, the output unit 2005 generates confirmed information and controls the communication unit 2220 to output the confirmed information upon receipt of a clerk code via the first reception unit 2004. The checkout information is information necessary for the checkout process for the customer C to pay the price of the purchased commodity, and includes, for example, the commodity code, commodity name, price, or the like of the commodity registered by the registration unit 2002. In the present embodiment, the output unit 2005 controls the communication unit 220 to output the clerk code acquired by the first reception unit 2004 without generating new confirmed information. In other words, the output unit 2005 also uses the clerk code acquired by the first reception unit 2004 as the confirmed information.

When the checkout device 2 receives the confirmed information in a case where the received checkout information includes information about an age-restricted commodity, the checkout device 2 recognizes that age confirmation for the age-restricted commodity has been made and executes the checkout process. On the other hand, when the checkout device 2 does not receive the confirmed information in a case where the received checkout information includes information about an age-restricted commodity, the checkout device 2 can notify the customer C to have his or her age verified without immediately performing the checkout process.

When the tablet terminal 20 includes the checkout processing unit for communicating with the payment server to perform cashless payment as described above, the output unit 2005 outputs confirmed information and payment information to the checkout processing unit.

The second reception unit 2006 acquires member identification information for identifying a member of the store. Specifically, the second reception unit 2006 controls the card reader 24 to read a member code from a membership card. The second reception unit 2006 may acquire the member code from the touch panel 22 into which the member code is input.

When the first reception unit 2004 acquires a clerk code, the storage unit 2007 stores the clerk code in the RAM 203. Specifically, when the first reception unit 2004 acquires a clerk code in a state where the second reception unit 2006 has not acquired any member code, the storage unit 2007 stores the clerk code in the RAM 203.

The storage unit 2007 stores in the storage unit 210 the age confirmation information in which the member identification information acquired by the second reception unit 2006 and the information indicating that clerk identification information has been received are associated with each other. Specifically, the storage unit 2007 refers to the age confirmation management file 215 when the first reception unit 2004 acquires a clerk code, after the second reception unit 2006 acquires a member code from the card reader 24. Then, when the field of the age confirmation flag corresponding to the member code acquired by the second reception unit 2006 is "0", the storage unit 2007 registers "1" in the field of the age confirmation flag to update the age confirmation management file 215. When the field of the age confirmation flag corresponding to the member code acquired by the second reception unit 2006 is "1", the storage unit 2007 does not update the age confirmation management file 215.

When the commodity identified by the commodity identification information input to the input unit 2001 is an age-restricted commodity, the notification unit 2008 provides a notification prompting the input of clerk identification information. Specifically, in a case where the commodity identified by the commodity code input to the input unit 2001 is an age-restricted commodity and the second reception unit 2006 has not acquired any member code, when a clerk code is not stored in the RAM 203, the notification unit 2008 provides a notification prompting the input of the clerk code. When the commodity identified by the commodity code input to the input unit 2001 is an age-restricted commodity and the second reception unit 2006 has acquired a member code, the notification unit 2008 refers to the age confirmation management file 215 and provides a notification prompting the input of clerk identification information. More specifically, when "0" is registered in the field of the age confirmation flag corresponding to the member code acquired by the second reception unit 2006, the notification unit 2008 provides a notification prompting the input of a clerk code. When "1" is registered in that field, the notification unit 2008 does not provide the notification. The notification unit 2008 performs the notification by controlling the display 21 to display a message such as "Please receive age confirmation from a clerk". The notification unit 2008 may perform the notification for prompting the input of the clerk code by controlling a speaker (not shown) to output a voice sound.

The operation of the checkout system 1 having the above configuration will be described. First, the customer C pushes and moves the shopping cart 10 on the sales floor, has a commodity code being read by the scanner 23, which is indicated by a barcode attached to a commodity to be purchased, and stores the commodity in the basket K. The customer C performs the same operation on all the commodities to be purchased.

The commodity information for which the commodity codes have been read are stored in the tablet terminal 20 and registered. When one of the commodities identified by the commodity code read by the scanner 23 is an age-restricted commodity such as alcoholic beverages and age confirmation information needs to be provided by a clerk, the tablet terminal 20 provides a notification to prompt the input of a clerk code. The customer C talks to a clerk to request age confirmation in the store. After confirming the age of the customer C, the clerk inputs the clerk code to the tablet terminal 20 when the clerk determines that the customer C has no problem in purchasing the age-restricted commodity. At this time, the tablet terminal 20 may be able to separately input information indicating that the clerk has confirmed the age in addition to the input of the clerk code. The tablet terminal 20 stores the input clerk code or information indicating that the clerk code has been input.

When one of the commodities identified by the commodity code read by the scanner 23 is an age-restricted commodity such as alcoholic beverages and the age confirmation information needs to be provided by a clerk, the tablet terminal 20 may transmit, to the store server 3, information indicating that there is a customer whom age confirmation is required. The store server 3 that has received the above information can display the information on a display (not shown) in the sales floor, or can transmit the information to a mobile terminal device (not shown) operated by a clerk. Thus, the clerk can recognize that there is a customer who needs age confirmation and move to the display shelf of the age-restricted commodity, so that the customer C does not need to search for and talk to the clerk.

The customer C moves together with the shopping cart 10 to the installation location of the checkout device 2 in order to pay the price of the purchased commodities. Then, when the checkout instruction is input to the tablet terminal 20 by the operation of the customer C, the checkout information is transmitted from the tablet terminal 20 to the checkout device 2, and the customer C can pay the price of the commodities using the checkout device 2. When the checkout device 2 does not receive any clerk code even though the payment information received by the checkout device 2 includes commodity information on an age-restricted commodity, the checkout device 2 determines that the age confirmation for the age-restricted commodity has not been made, and displays an error message indicating that the checkout process cannot be executed as it is. At the same time, the checkout device 2 displays a screen prompting the customer to receive age confirmation from the clerk. As such, the customer C can shop using the checkout system 1.

Figure 9:
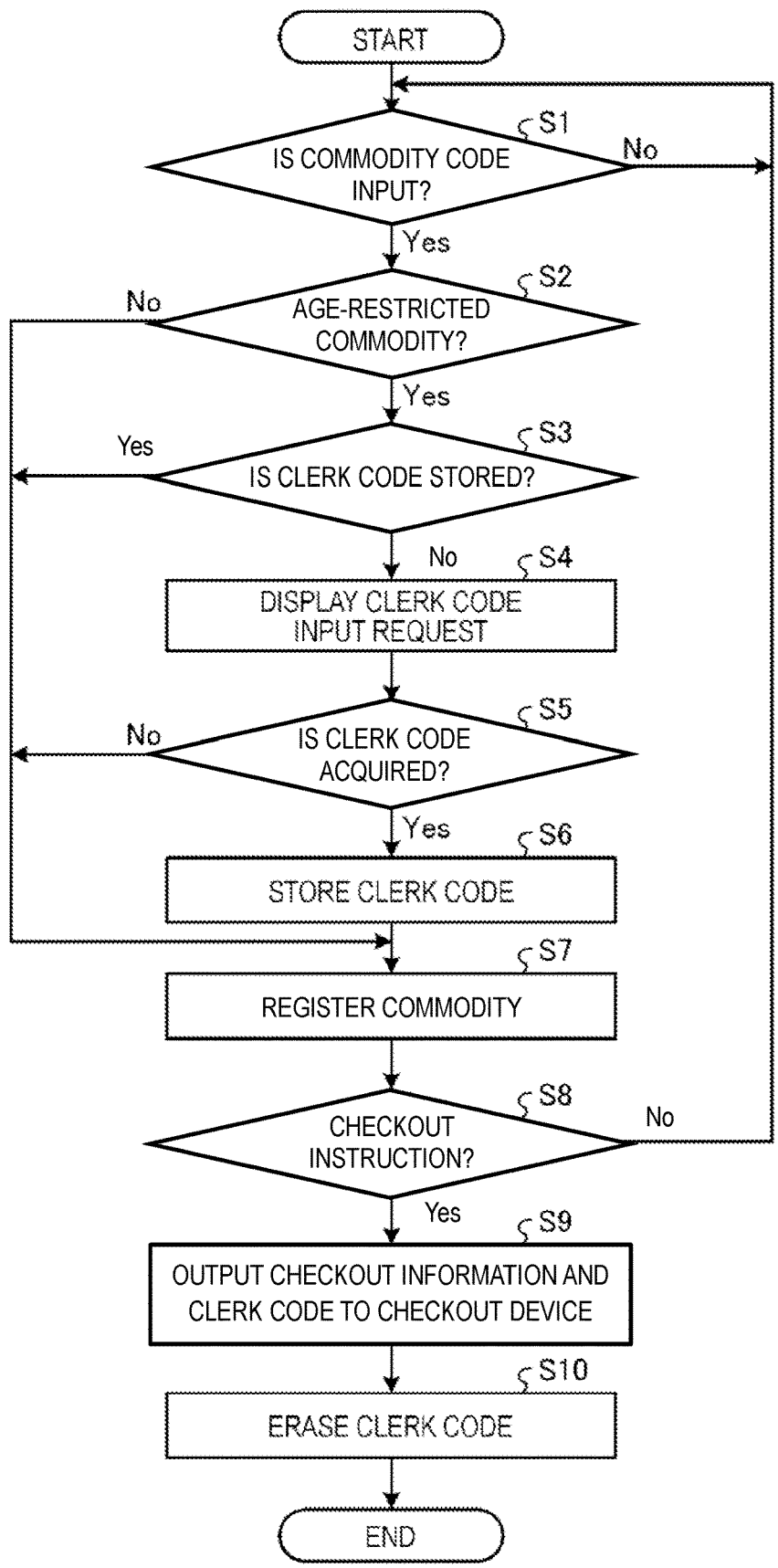
FIG. 9 is a flowchart of a process executed by an information processing terminal device.

Next, the process executed by the tablet terminal 20 will be described. FIG. 9 is a flowchart of a process executed by the tablet terminal 20.

First, the control unit 200 determines whether a commodity code is input to the input unit 2001 (S1), and if not (No in S1), returns to the process of S1 and waits. In other words, the control unit 200 determines whether the scanner 23 has read any commodity code from a barcode attached to a commodity.

When a commodity code is input to the input unit 2001 (Yes in S1), the determination unit 2003 determines whether the commodity identified by the input commodity code is an age-restricted commodity (S2). Specifically, the determination unit 2003 refers to the commodity master 212 and determines whether "1" is stored in the field of the age-restricted commodity flag corresponding to the input commodity code.

When "1" is stored in the field of the age-restricted commodity flag corresponding to the input commodity code and the commodity identified by the commodity code is an age-restricted commodity (Yes in S2), the control unit 200 determines whether any clerk code is stored in the RAM 203 (S3). In other words, the control unit 200 determines whether any clerk has already confirmed the customer's age in the current transaction.

When any clerk code is not stored in the RAM 203 (No in S3), the notification unit 2008 controls the display 21 to display a message requesting the input of a clerk code (S4). For example, the notification unit 2008 controls the display 21 to display a message "Please receive age confirmation from a clerk". Subsequently, the control unit 200 determines whether the clerk code is acquired by the first reception unit 2004 (S5). In other words, the control unit 200 determines whether a clerk has confirmed the age in response to the message displayed in S5.

When the clerk code is acquired (Yes in S5), the storage unit 2007 stores the acquired clerk code in the RAM 203 (S6). Next, the registration unit 2002 registers the commodity identified by the commodity code input in the process of S1 (S7).

When the commodity identified by the commodity code input to the input unit 2001 is not an age-restricted commodity (No in S2), the control unit 200 skips the processes of S3 to S6 and proceeds to S7. When a clerk code is stored in the RAM 203 (Yes in S3), the control unit 200 skips the processes of S4 to S6 and proceeds to S7. When the first reception unit 2004 does not acquire the clerk code (No in S5), the control unit 200 skips the process of S6 and proceeds to S7.

Following the commodity registration in S7, the control unit 200 determines whether a checkout instruction has been input (S8), and if not (No in S8), returns to the process in S1. When a checkout instruction is input (Yes in S8), the output unit 2005 controls the communication unit 220 to output checkout information and the clerk code to the checkout device 2 (S9). Here, the clerk code output by the output unit 2005 is an example of information indicating that any clerk code has been acquired. When the clerk code is not stored in the RAM 203, the output unit 2005 does not control the communication unit 220 to output any clerk code. Next, when the clerk code is stored in the RAM 203, the storage unit 2007 erases the clerk code (S10). Thus, when another customer C uses the shopping cart 10, no information indicating that the age has been confirmed remains. Then, the control unit 200 ends the process.

According to the first embodiment, when a customer purchases an age-restricted commodity, a clerk can confirm his or her age before the checkout process by the checkout device 2, so that the checkout process can be performed quickly. Accordingly, it is possible to prevent the cash register waiting time of the customer C from increasing. In the unlikely event that the age has not been confirmed on the sales floor due to reasons such as a clerk not being found on the sales floor, a clerk can confirm the customer's age using the checkout device 2. The age confirmation by the clerk only needs to be performed once in one transaction, and it is not necessary to confirm the age each time an age-restricted commodity is registered, so that the customer C and the clerk are not bothered.

Second Embodiment

Figure 10:
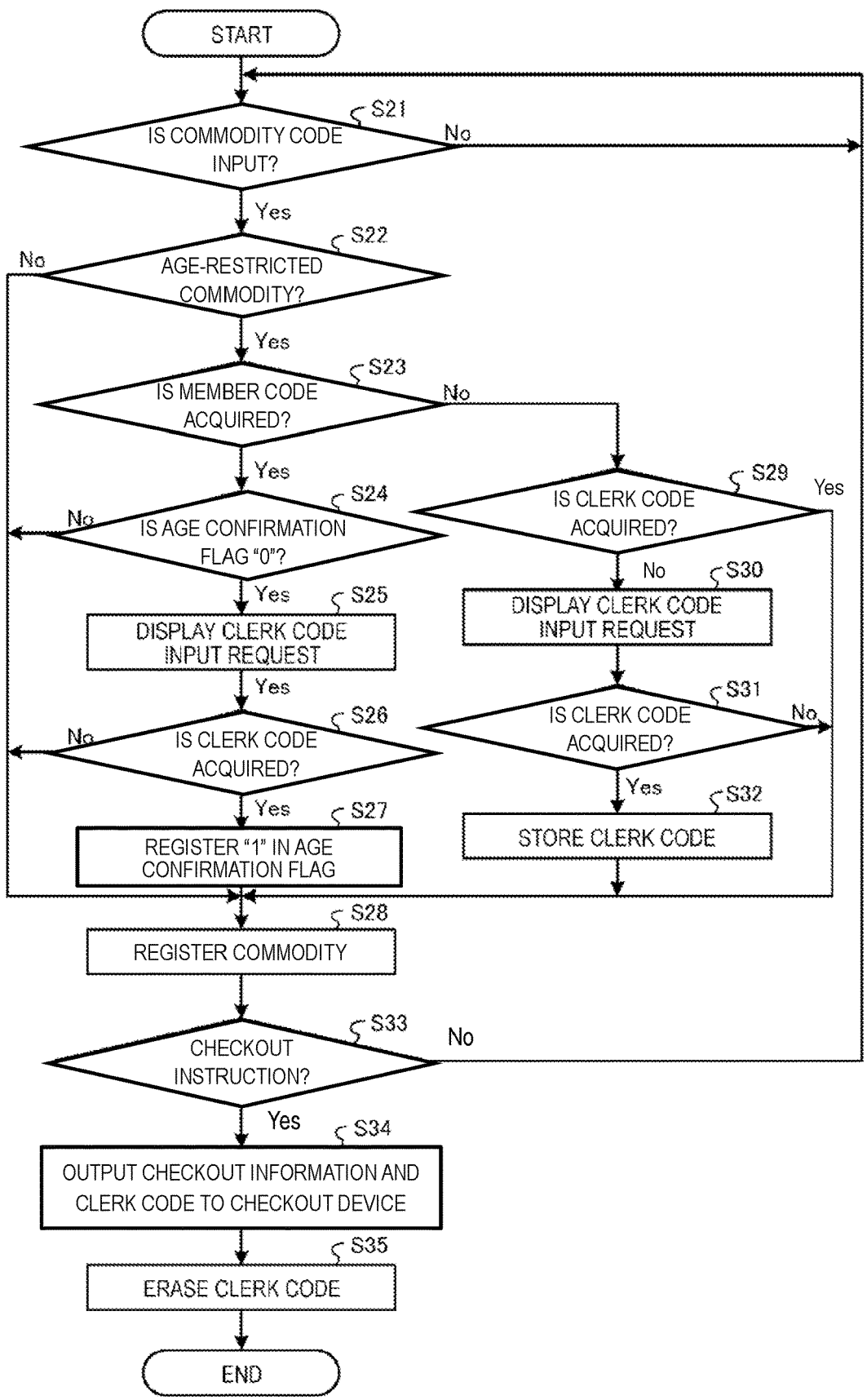
FIG. 10 is a flowchart of a process executed by an information processing terminal device according to a second embodiment.

Next, a second embodiment will be described. The second embodiment is different from the first embodiment in that the age confirmation is not required when the age of the customer C has been confirmed in the past transaction. FIG. 10 is a flowchart of a process executed by the tablet terminal 20 according to the second embodiment.

The control unit 200 determines whether a commodity code is input to the input unit 2001 (S21), and if not (No in S21), returns to the process of S21 and waits. In other words, the control unit 200 determines whether the scanner 23 has read a commodity code from a barcode attached to a commodity.

When a commodity code is input to the input unit 2001 (Yes in S21), the determination unit 2003 determines whether the commodity identified by the input commodity code is an age-restricted commodity (S22). Specifically, the determination unit 2003 refers to the commodity master 212 and determines whether "1" is stored in the field of the age-restricted commodity flag corresponding to the input commodity code.

When "1" is stored in the field of the age-restricted commodity flag corresponding to the input commodity code and the commodity identified by the commodity code is an age-restricted commodity (Yes in S22), the control unit 200 determines whether the second reception unit 2006 has acquired a member code (S23). In other words, the control unit 200 determines whether the card reader 24 has read a member code.

When the second reception unit 2006 has acquired a member code (Yes in S23), the control unit 200 refers to the age confirmation management file 215 and determines whether "0" is registered in the field of the age confirmation flag corresponding to the member code (S24). In other words, the control unit 200 determines whether the age of the member identified by the member code acquired by the second reception unit 2006 has been confirmed in the current or past transaction.

When "0" is registered in the age confirmation flag (Yes in S24), the notification unit 2008 controls the display 21 to display a message requesting the input of a clerk code (S25). The display of the message by the notification unit 2008 is the same as that in the first embodiment. Subsequently, the control unit 200 determines whether the first reception unit 2004 has acquired a clerk code (S26). In other words, the control unit 200 determines whether a clerk has confirmed the age in response to the message displayed in S25.

When a clerk code is acquired (Yes in S26), the storage unit 2007 registers "1" in the age confirmation flag (S27). Specifically, the storage unit 2007 rewrites the field of the age confirmation flag corresponding to the member code acquired by the second reception unit 2006 in S23 from "0" to "1" in the age confirmation management file 215. Next, the registration unit 2002 registers the commodity identified by the commodity code input in the process of S21 (S28).

When the commodity identified by the commodity code input to the input unit 2001 is not an age-restricted commodity (No in S22), the control unit 200 skips the processes of S23 to S27 and proceeds to S28. When "0" is not registered in the age confirmation flag corresponding to the member code input to the input unit 2001 in the age confirmation management file 215, that is, "1" is already registered (No in S24), the control unit 200 skips the processes of S25 to S27 and proceeds to S28. When the first reception unit 2004 does not acquire a clerk code (No in S26), the control unit 200 skips the process of S27 and proceeds to S28.

When the second reception unit 2006 does not acquire a member code in the process of S23 (No in S23), the control unit 200 determines whether a clerk code is stored in the RAM 203 (S29). In other words, the control unit 200 determines whether a clerk has already confirmed the customer's age in the current transaction.

When a clerk code is not stored in the RAM 203 (No in S29), the notification unit 2008 controls the display 21 to display a message requesting the input of a clerk code as in the process of S25 (S30). Subsequently, the control unit 200 determines whether the first reception unit 2004 has acquired a clerk code (S31). In other words, the control unit 200 determines whether a clerk has confirmed the age in response to the message displayed in S30.

When a clerk code is acquired (Yes in S31), the storage unit 2007 stores the acquired clerk code in the RAM 203 (S32). Next, the control unit 200 proceeds to the process of S28. When a clerk code is stored in the RAM 203 (Yes in S29), the control unit 200 skips the processes of S30 to S32 and proceeds to S28. When the first reception unit 2004 does not acquire any clerk code (No in S31), the control unit 200 skips the process of S32 and proceeds to S28.

Following the commodity registration in S28, the control unit 200 determines whether a checkout instruction has been input (S33), and if not (No in S33), returns to the process in S21. When the checkout instruction is input (Yes in S33), the output unit 2005 controls the communication unit 220 to output checkout information and the clerk code to the checkout device 2 (S34). The second embodiment is similar to the first embodiment in that the clerk code output by the output unit 2005 is an example of information indicating that the first reception unit 2004 has acquired the clerk code, and when the clerk code is not stored in the RAM 203, the output unit 2005 does not control the communication unit 220 to output the clerk code. Next, when the clerk code is stored in the RAM 203, the storage unit 2007 erases the clerk code (S35). Thus, when another customer C uses the shopping cart 10, no information indicating that the age has been confirmed remains. Then, the control unit 200 ends the process.

According to the second embodiment, the same effect as that of the first embodiment is achieved. According to the second embodiment, the age confirmation is not required when the age of the customer C has been confirmed by a clerk in the past transaction. Therefore, the labor of the customer C and the work of the clerk can be reduced.

Third Embodiment

Figure 11:
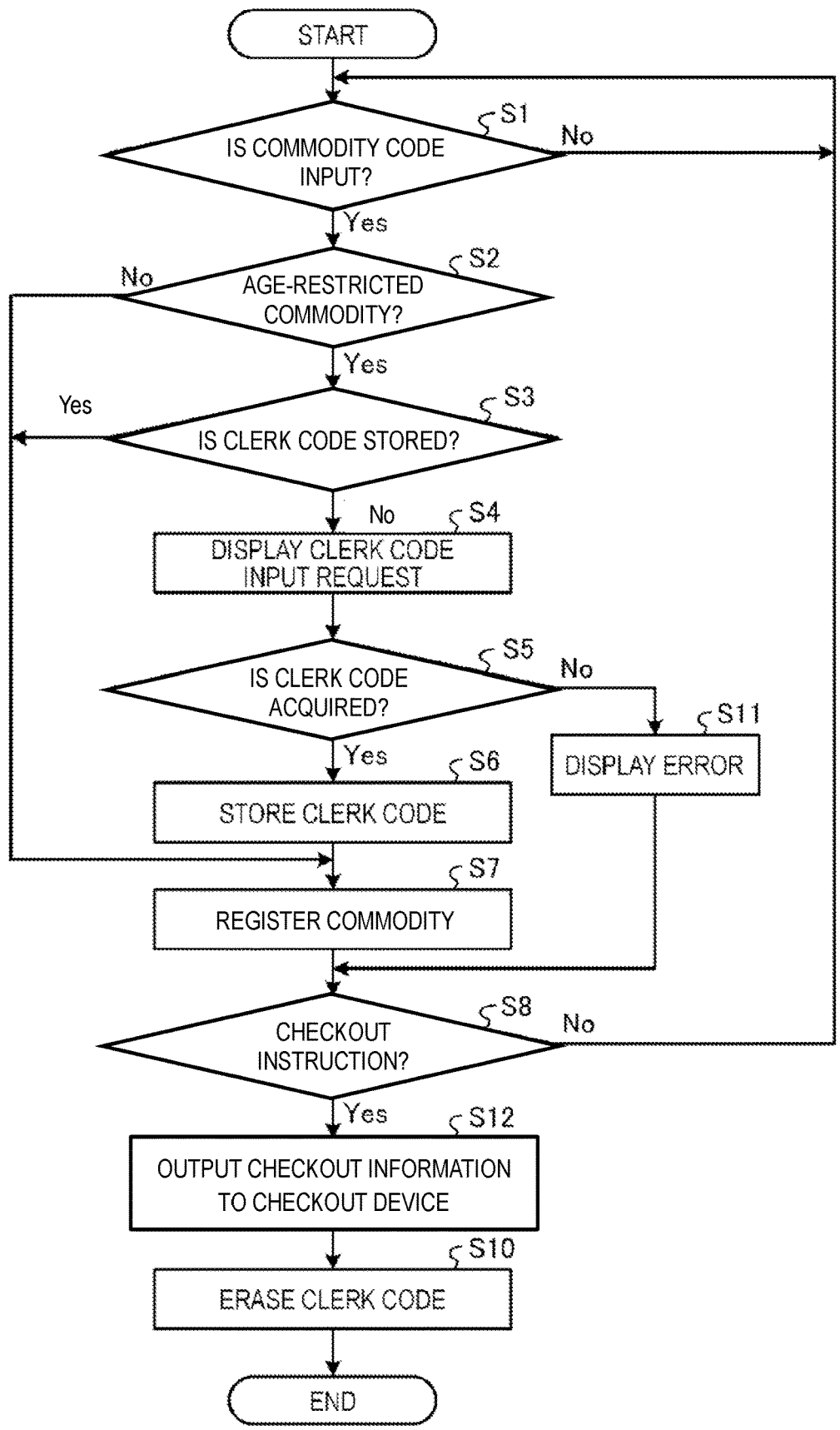
FIG. 11 is a flowchart of a process executed by an information processing terminal device according to a third embodiment.

Next, a third embodiment will be described. The third embodiment is different from the first embodiment in that an age-restricted commodity can be registered on the condition that the age confirmation has been made. Since many of the processes of the control unit 200 of the third embodiment are the same as those of the first embodiment, the same reference numerals are given to the same processes, and duplicate description will be omitted. FIG. 11 is a flowchart of a process executed by the tablet terminal 20 according to the third embodiment.

When the first reception unit 2004 does not acquire a clerk code in the process of S5 (No in S5), the notification unit 2008 controls the display 21 to display an error (S11). That is, when a commodity identified by a commodity code input to the input unit 2001 is an age-restricted commodity, and the customer's age is not confirmed in the current transaction, the notification unit 2008 controls the display 21 to display an error. Here, the control unit 200 controls a speaker (not shown) to output a confirmation sound that is emitted when a commodity is registered. The error displayed on the display 21 indicates that the commodity has not been registered, for example, "The commodity cannot be registered because your age has not been confirmed". After that, the control unit 200 proceeds to the process of S8.

When a checkout instruction is input in the process of S8 (Yes in S8), the output unit 2005 controls the communication unit 220 to output checkout information to the checkout device 2 (S12). In the present embodiment, since an age-restricted commodity is not registered without age confirmation, it is not necessary to output the information indicating that the first reception unit 2004 has acquired a clerk code, that is, the information indicating that the age has been confirmed. It is because it is not necessary for the checkout device 2 that receives the information from the output unit 2005 to determine whether the age confirmation for the age-restricted commodity has been made.

According to the third embodiment, the same effect as that of the first embodiment is achieved. According to the third embodiment, since the commodity registration of an age-restricted commodity is executed on the condition that the age is confirmed, it is possible to reliably confirm the age when the store sells the age-restricted commodity.

Fourth Embodiment

Figure 12:
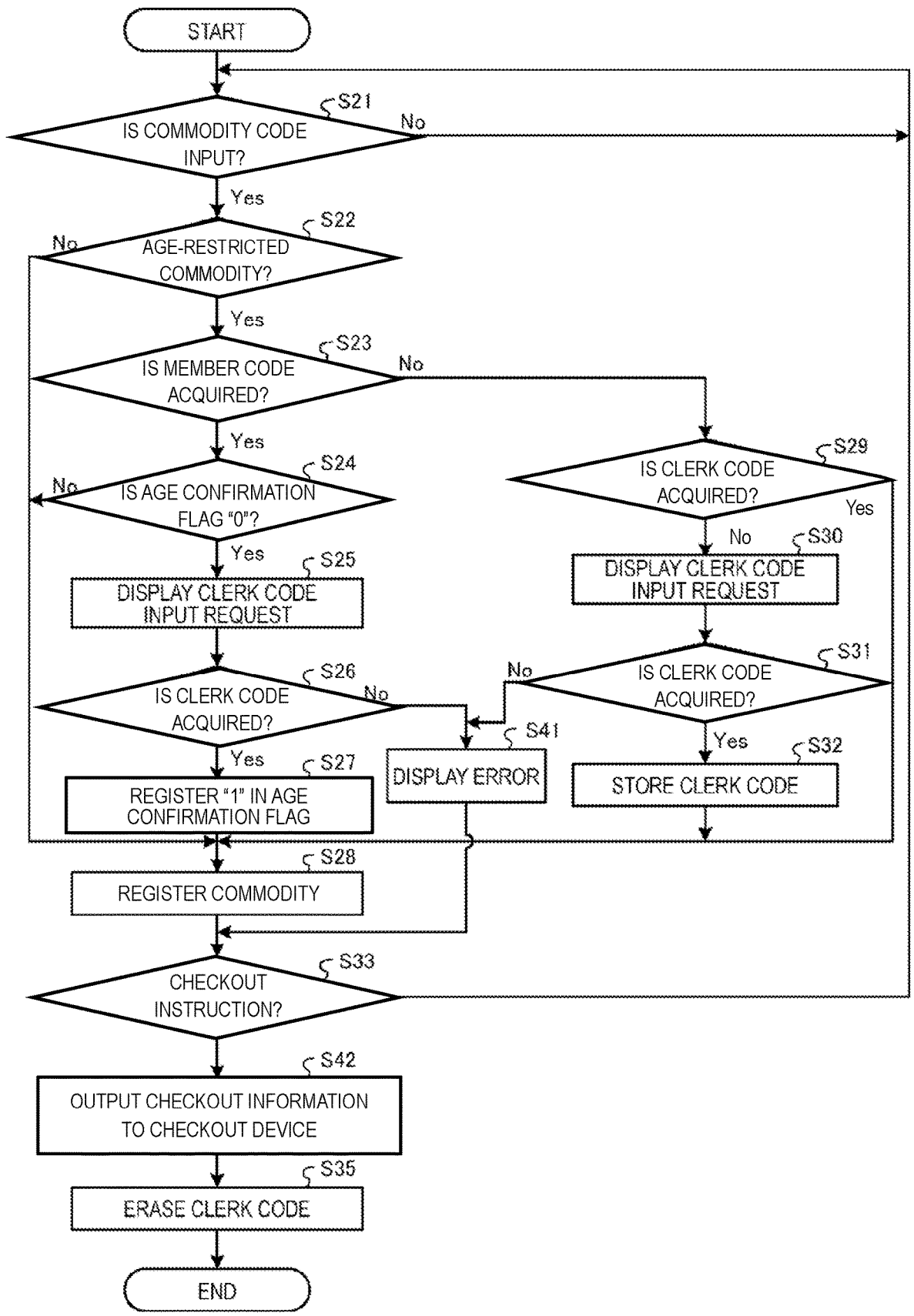
FIG. 12 is a flowchart of a process executed by an information processing terminal device according to a fourth embodiment.

Next, a fourth embodiment will be described. The fourth embodiment is different from the second embodiment in that an age-restricted commodity can be registered on the condition that a clerk has confirmed the customer's age. Since many of the processes of the control unit 200 of the fourth embodiment are the same as those of the second embodiment, the same reference numerals are given to the same processes, and duplicate description will be omitted. FIG. 12 is a flowchart of a process executed by the tablet terminal 20 according to the fourth embodiment.

When the first reception unit 2004 does not acquire a clerk code in the process of S26 (No in S26), the notification unit 2008 controls the display 21 to display an error (S41). That is, when it is determined that a commodity identified by a commodity code input to the input unit 2001 is an age-restricted commodity, the customer C is a member of the store, and the age of the customer C has not been confirmed in the current or past transaction, the notification unit 2008 controls the display 21 to display an error. The error display is the same as the error display in the third embodiment, and is a display indicating that the commodity has not been registered.

When the first reception unit 2004 does not acquire a clerk code in the process of S31 (No of S31), the control unit 200 proceeds to the process of S41. That is, when it is determined that the commodity identified by the commodity code input to the input unit 2001 is an age-restricted commodity, the customer C is not a member of the store, and the age of the customer C has not been confirmed in the current transaction, the notification unit 2008 controls the display 21 to display an error.

When a checkout instruction is input in the process of S33 (Yes in S33), the output unit 2005 controls the communication unit 220 to output checkout information to the checkout device 2 (S12). Similar to the third embodiment, the first reception unit 2004 does not control the communicate unit 220 to output the information indicating that a clerk code has been received, that is, the information indicating that the age has been confirmed.

According to the fourth embodiment, the same effect as that of the second embodiment is achieved. According to the fourth embodiment, since commodity registration of an age-restricted commodity is executed on the condition that the customer's age is confirmed, it is possible to reliably confirm the age when the store sells age-restricted commodities.

As described above, the tablet terminal 20 of one of the above embodiments is an information processing terminal device operated by a customer C moving in a store. The information processing terminal device includes: the input unit 2001 to which commodity identification information for identifying a commodity is input; the registration unit 2002 that registers the commodity based on the commodity identification information which has been input to the input unit 2001; the first reception unit 2004 that acquires clerk identification information for identifying a clerk of the store which sells the commodity; and the output unit 2005 that, when the commodity registered by the registration unit 2002 is an age-restricted commodity that requires age confirmation, controls the communication unit 220 to output information indicating that the first reception unit 2004 has acquired the clerk identification information and checkout information about a price of the commodity registered by the registration unit 2002.

Thus, the age of the customer C who purchases the age-restricted commodity can be confirmed by using the tablet terminal 20 operated by the customer C who moves in the store. Therefore, since the age can be confirmed before the checkout process by the checkout device 2 or the like, the checkout process can be performed quickly.

The tablet terminal 20 of one of the above embodiments is an information processing terminal device operated by a customer C moving in a store. The information processing terminal device includes: the input unit 2001 to which commodity identification information for identifying a commodity is input; the registration unit 2002 that registers the commodity based on the commodity identification information which has been input to the input unit 2001; the first reception unit 2004 that acquires clerk identification information for identifying a clerk of the store which sells the commodity; and the output unit 2005 that controls the communication unit 220 to output checkout information about a price of the commodity registered by the registration unit 2002. When the commodity identified by the commodity identification information input to the input unit 2001 is an age-restricted commodity that requires age confirm, the registration unit 2002 registers the commodity on a condition that the first reception unit 2004 acquires the clerk identification information.

Thus, the age of the customer C who purchases the age-restricted commodity can be confirmed by using the tablet terminal 20 operated by the customer C who moves in the store. Therefore, since the age can be confirmed before the checkout process by the checkout device 2 or the like, the checkout process can be performed quickly. Since the tablet terminal 20 executes the commodity registration of the age-restricted commodity on the condition that the age is confirmed, it is possible to reliably confirm the age when the store sells the age-restricted commodity.

The tablet terminal 20 of one of the above embodiments further includes the second reception unit 2006 that acquires member identification information for identifying a member of the store, and the storage unit 2007 that stores in the storage unit 210 age confirmation information in which the member identification information acquired by the second reception unit 2006 is associated with information indicating that the first reception unit 2004 has acquired the clerk identification information.

Thus, the tablet terminal 20 can eliminate the need for the age confirmation when the age of the customer C has been confirmed in the past transaction. Therefore, the labor of the customer C and the work of the clerk can be reduced.

The tablet terminal 20 of one of the above embodiments further includes the notification unit 2008 that provides a notification for prompting the input of the clerk identification information when the commodity identified by the commodity identification information input to the input unit 2001 is an age-restricted commodity.

As a result, the tablet terminal 20 can prompt the customer C who purchases the age-restricted commodity to verify his or her age. Therefore, it is possible to reliably confirm the age when the store sells the age-restricted commodity.

In the above embodiments, the control program 211 executed by the tablet terminal 20 (including the mobile terminal when the information processing terminal is a mobile terminal owned by the customer C) may be recorded and copied from various computer-readable recording media such as a CD-ROM. The control program 211 executed by the tablet terminal 20 in the above embodiments may be stored in a computer connected to a network such as the Internet and downloaded therefrom via the network.

While the exemplary embodiments have been described above, the embodiments have been presented as examples, and are not intended to limit the scope of the disclosure. The embodiments can be achieved in a variety of other forms, and various omissions, replacements and changes can be made, without departing from the scope of the disclosure. For example, when the information processing terminal device is a smartphone on which a program for reading a commodity code or a clerk code is installed, the commodity code or the clerk code can be read from a bar code or the like by using the camera function of the smartphone. The embodiments and variations thereof are included in the scope and spirit of the disclosure, and included in the scope of the invention and their equivalents as described in the appended claims.

What is claimed is:

1. A mobile registration terminal for a customer in a store, comprising:
    a network interface;
    a display;
    a scanner; and
    a processor configured to:
        when a commodity sold at the store is scanned through the scanner, determine whether the commodity is an age-restricted commodity,
        upon determining that the commodity is not an age-restricted commodity, register the commodity, and
        upon determining that the commodity is an age-restricted commodity,
            control the display to display a screen indicating that an age of the customer needs to be verified by a clerk of the store, and
            after clerk information about the clerk is input through the scanner, control the network interface to transmit to an external device the clerk information for checkout of the commodity without further verification of the age of the customer.

2. The mobile registration terminal according to claim 1, further comprising:
    a memory, wherein
    the processor is configured to, upon receipt of the input of the clerk information, store the clerk information in the memory.

3. The mobile registration terminal according to claim 2, wherein the processor is configured to, after the commodity is checked out, erase the clerk information from the memory.

4. The mobile registration terminal according to claim 1, wherein the processor is configured to register the age-restricted commodity after the clerk information is input through the scanner.

5. The mobile registration terminal according to claim 1, wherein the processor is configured to control the display to display an error when the clerk information is not input after determining that the commodity is an age-restricted commodity.

6. The mobile registration terminal according to claim 1, further comprising:
    a reader, wherein
    the processor is further configured to, when a medium issued by the store for the customer is read through the reader, acquire member information about the customer, and determine whether the age of the customer has been verified in a current or previous transaction using the acquired member information, and
    the processor controls the display to display the screen when the age of the customer has not been verified in the current or previous transaction.

7. The mobile registration terminal according to claim 6, wherein the processor controls the network interface to transmit the clerk information in association with the member information.

8. A mobile registration method for a terminal operated by a customer in a store, the method comprising:
    when a commodity sold at the store is scanned through a scanner, determining whether the commodity is an age-restricted commodity;
    upon determining that the commodity is not an age-restricted commodity, registering the commodity; and
    upon determining that the commodity is an age-restricted commodity,
        displaying a screen indicating that an age of the customer needs to be verified by a clerk of the store, and
        after clerk information about the clerk is input through the scanner, transmitting to an external device the clerk information for checkout of the commodity without further verification of the age of the customer.

9. The method according to claim 8, further comprising: upon receipt of the input of the clerk information, storing the clerk information in a memory.

10. The method according to claim 9, further comprising: after the registered commodity is checked out, erasing the clerk information from the memory.

11. The method according to claim 8, further comprising: registering the age-restricted commodity after the clerk information is input through the scanner.

12. The method according to claim 11, further comprising:
    displaying an error when the clerk information is not input after determining that the commodity is an age-restricted commodity.

13. The method according to claim 8, further comprising: after determining that the commodity is an age-restricted commodity, reading a medium issued by the store for the customer through a reader and acquiring member information about the customer; and determining whether the age of the customer has been verified in a current or previous transaction using the acquired member information, wherein the screen is displayed when the age of the customer has not been verified in the current or previous transaction.

14. The method according to claim 13, wherein the clerk information is transmitted in association with the member information.

15. A checkout system comprising:

an external device; and a mobile registration terminal for a customer in a store, the mobile registration terminal comprising:
  a network interface,
  a display,
  a scanner, and
  a processor configured to:
    when a commodity sold at the store is scanned through the scanner, determine whether the commodity is an age-restricted commodity,
    upon determining that the commodity is not an age-restricted commodity, register the commodity, and
    upon determining that the commodity is an age-restricted commodity,
      control the display to display a screen indicating that an age of the customer needs to be verified by a clerk of the store, and
      after clerk information about the clerk is input through the scanner, control the network interface to transmit the clerk information to the external device for checkout of the commodity without further verification of the age of the customer.

16. The checkout system according to claim 15, wherein the mobile registration terminal is attached to a shopping cart.

17. The checkout system according to claim 15, wherein the mobile registration terminal comprises a memory, and the processor is configured to, upon receipt of the input of the clerk information, store the clerk information in the memory.

18. The checkout system according to claim 17, wherein the processor is configured to, after the commodity is checked out, erase the clerk information from the memory.

19. The checkout system according to claim 15, wherein the processor is configured to register the age-restricted commodity after the clerk information is input through the scanner.

20. The checkout system according to claim 19, wherein the processor is configured to control the display to display an error when the clerk information is not input after determining that the commodity is an age-restricted commodity.

* * * * *